Figure 1:
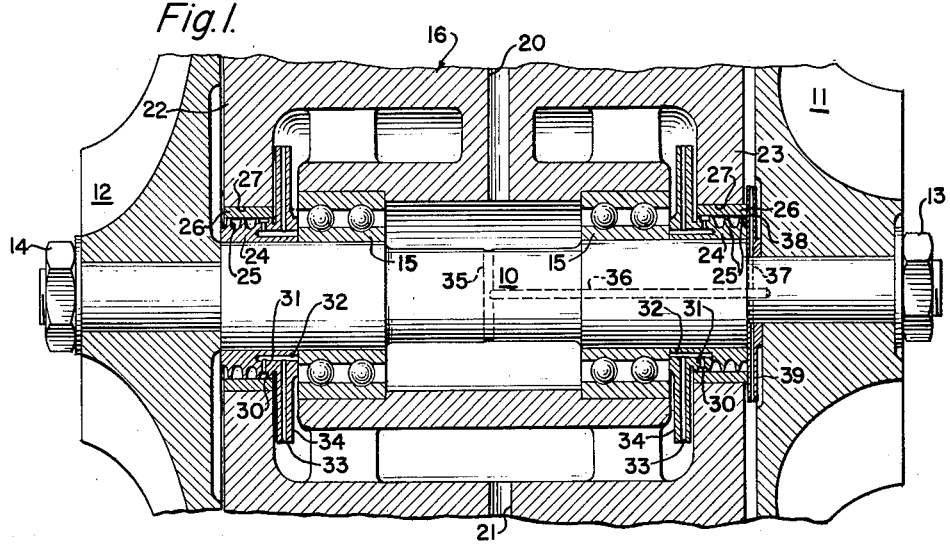

Oct. 17, 1961  J. W. MEERMANS  3,004,782
SHAFT SEAL
Filed Nov. 13, 1957

INVENTOR:
JOHN W. MEERMANS,

BY
Theodore E. Bieber

Attorney.

United States Patent Office 3,004,782
Patented Oct. 17, 1961

3,004,782
SHAFT SEAL
John William Meermans, North Hollywood, Calif., assignor to The Garrett Corporation, Los Angeles, Calif., a corporation of California
Filed Nov. 13, 1957, Ser. No. 696,142
5 Claims. (Cl. 286—5)

This invention pertains to shaft seals and more particularly to a shaft seal which incorporates a means for positively scavenging the oil from the seal and returning it to the interior of the housing in which the shaft is mounted.

In many rotating machines it is necessary to provide shaft seals where the rotating shaft projects through an opening in the bearing housing, in order to prevent the escape of lubricant from the housing. All shaft seals, of course, have a rotating part and a stationary part, and some lubricant will flow along the static surface of the stationary part and escape from the bearing housing regardless of the effectiveness of the shaft seal. The quantity of oil lost by escaping along the static member is usually very small but in machines which must operate with an absolute minimum of oil consumption even this small loss cannot be tolerated. For example, in turbine-driven compressors used on air cycle air conditioning systems in aircraft, the quantity of lubricant carried by the machine is small and losses must be held to a minimum if the machine is to operate for long periods without maintenance or servicing.

This invention solves the problem of lubricant escaping from the bearing housing along the static portion of the seal by providing a shaft seal utilizing a labyrinth or other type seal on the outboard end of the shaft and a positive pump means for removing oil from the inboard end of the shaft seal and returning it to the interior of the housing. The pump means is disposed so that its suction inlet opens adjacent the inboard end of the labyrinth seal and its discharge outlet communicates with the interior of the housing. The use of the pump creates sufficient force to remove the lubricant from the static part of the seal and return it to the bearing housing.

Accordingly, it is the principal object of this invention to provide a shaft seal utilizing a low leakage type seal and a pump means to scavenge the oil from the inboard end of the seal and return it to the interior of the housing.

Another object of this invention is to provide a shaft seal which utilizes a labyrinth type seal on the outboard end of the shaft and a centrifugal pump mounted adjacent the inboard end of the labyrinth seal. The suction inlet of the centrifugal pump is connected to a shallow circumferential groove formed in the outer surface of the shaft seal immediately adjacent the inboard end of the labyrinth seal, while the pump discharges into the interior of the housing.

A further object of this invention is to provide a shaft seal utilizing a labyrinth seal on the outboard end of the shaft and a screw type positive displacement pump to remove oil from the inner surface of the stationary member of the labyrinth seal and return it to the interior of the housing.

Figure 2:
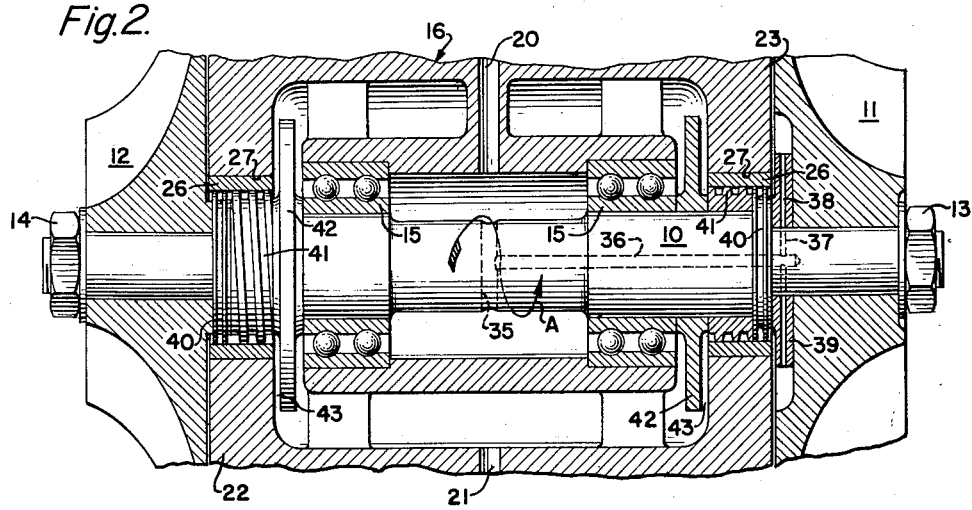

These and other objects and advantages of this invention will be more easily understood by those skilled in this art from the following detailed description of the preferred embodiment thereof, and from a modification of this embodiment, when taken in conjunction with the attached drawing, in which:

FIG. 1 is a longitudinal cross-section of a rotating assembly of a turbine-driven compressor unit showing a shaft seal constructed according to this invention; and FIG. 2 is a modification of the shaft seal shown in FIG. 1 which utilizes a screw type of pump in place of the centrifugal pump shown in FIG. 1.

Referring to FIG. 1, there is shown a turbine-driven compressor unit having a shaft 10 with a turbine wheel 11 mounted on one end and a compressor wheel 12 mounted on the opposite end. The turbine and compressor wheels are secured to opposite ends of the shaft by means of nuts 13 and 14. The shaft 10 is rotatably supported in the housing 16 of the unit by means of two spaced ball bearings 15. A passageway 20 is formed in the housing 16 for supplying lubricant to the two bearings 15, while a drain line 21 is formed on the bottom of the housing for removing the lubricant.

The shaft sealing means of this invention is disposed on the portion of the shaft 10 which projects through the opposite end walls 22 and 23 of the housing. The shaft sealing means consists of a sleeve member 24, which is secured to the shaft 10 and a stationary bushing 26 mounted, as by pressing, in the bores 27 of the end walls. The sleeve member 24 is provided with a radial flange 34 at its inboard end and a plurality of radially projecting lands or ridges 25 adjacent its outboard end. The bushing 26 is preferably formed of a softer material than the sleeve 24 so that any actual contact between the lands or ridges 25 and the bushing will result in wearing away of the bushing and not the lands. The outer diameter of the lands 25 should be made substantially the same as the inner diameter of the bushing 26 and assembled by broaching the sleeve 24 into the bushing 26. This will insure that the lands in cooperation with the bushing will form an effective labyrinth type seal.

A shallow circumferential groove 30 is formed in the outer surface of the sleeve 24 immediately adjacent the inboard end of the innermost one of the lands 25. The outer surface of the sleeve 24 on which the groove 30 is formed should have substantially the same diameter as the outer diameter of the lands 25, as shown in FIG. 1. A plurality of spaced radial passageways 31 are formed in the sleeve 24 and connect with the shallow groove 30 and a plurality of axial passageways 32 also formed in the sleeve 24. The axial passageways 32, in turn, connect with a plurality of spaced radial passageways 33 which are formed in the radial flange 34.

The interior of the housing 16 is vented to the turbine end of the unit by means of drilled passageways 35 and 36 in the shaft 10. The right end of the passageway 36 connects by means of drilled holes 37 with the inlet ends of the impeller passages 38 in the impeller 39. The impeller will create a sufficient pressure differential to properly vent the housing 16 to the turbine end of the unit as is more fully explained and claimed in a co-pending application of R. L. Schinnerer entitled "Lubrication System For High Speed Machines," Serial No. 535,643, filed September 21, 1955.

When the turbine-compressor unit described above is operated, lubricant will tend to escape not only along the shaft 10 where it projects through the end walls 22 and 23 but also along the inner or static surface of bushing 26. The leakage of lubricant from the interior of the housing 16 will be controlled by the labyrinth seal at the outboard end of the shaft and the scavenging action of the pump. In order to remove the lubricant from the static surface of the bushing 26, the shallow groove 30 and the suction of the centrifugal pump which is formed in the flange 34 by the radial passageways 33 are utilized. This suction pressure in the passageways 31 will tend to draw the lubricant from the inner surface of the bushing 26 so that it may be returned to the interior of the housing 16 by the pumping action of the radial passageways 33. The groove 30 should be maintained relatively shallow so that a sufficient suction will be created in close proximity to the inner surface of the bushing 26 to remove any lubricant from this surface. This is necessary in order to eliminate the effects of the centrifugal force set up in the groove 30.

A modification of the invention is shown in FIG. 2 in which helical lands 41 are formed on the inboard ends of the shaft where it projects through the end walls 22 and 23. Of course, the helical lands must have oppositely directed pitches in order that they will both tend to pump to the center of the housing when the shaft rotates in one direction. The outer diameter of the land 41 should be substantially the same as the bore of the bushing 26 in order to provide a good pumping action. A labyrinth seal 40 similar to the labyrinth seal shown in FIG. 1 is provided on the outboard end of the shaft. A radial flange 42 is also provided on the inboard end of the shaft and operates as a slinger to transfer the oil from the end of the helical land 41 back to the interior of the housing 16.

When the unit shown in FIG. 2 is rotated in the direction shown by the arrow A, the helical lands 41 will act as screw pumps to remove the lubricant which flows along the inner surface of bushing 26 and cause it to flow towards the radial flanges 42. The lands 41 in addition to their pumping action will tend to scrape the lubricant from the inner surface of the bushing 26 and cause it to flow towards the slingers due to the close clearances between the land 41 and the bushing 26.

While but two specific embodiments of this invention have been described in detail, many modifications and changes will occur to those skilled in the art within its broad spirit and scope.

I claim:

1. A fluid seal for a shaft rotatably mounted in a bore in a housing, comprising: a bushing fixedly mounted in said bore; sealing means mounted on said shaft, the sealing means including a labyrinth portion having a plurality of radially projecting lands in close fit with said bushing and a sleeve portion in close fit with the bushing inboard of said lands; a circumferential groove formed in the outer surface of said sleeve portion adjacent the inboard end of said bushing; pumping means comprising a radially projecting flange formed on the sealing means and a plurality of radially extending ejection passages in said flange adapted to discharge into the interior of said housing; and passage means connecting said circumferential groove with the pumping means for creating a suction in said groove to scavenge fluid from the surface of the bushing abutting said groove.

2. A fluid seal for a shaft rotatably mounted in a bore in a housing, comprising: a bushing fixedly mounted in said bore; sealing means mounted on said shaft, the sealing means including a labyrinth portion having a plurality of radially projecting lands in close fit with said bushing and a sleeve portion in close fit with the bushing inboard of said lands; a circumferential groove formed in the outer surface of said sleeve portion adjacent the inboard end of said bushing; and centrifugal pumping means actuated by the rotation of said shaft and operatively connected to the circumferential groove in said sleeve portion for creating a suction in the groove to scavenge fluid from the surface of said bushing abutting said groove and discharging it into the interior of said housing.

3. A fluid seal for a shaft rotatably mounted in a bore in a housing, comprising: a bushing fixedly mounted in the bore; sealing means disposed within said bushing, the sealing means including a member mounted on the shaft and provided with a labyrinth type seal having projecting land means in close fit with said bushing, said member having a sleeve portion in close fit with said bushing, the sleeve portion having a circumferential groove in the surface contiguous said bushing adjacent the inboard end thereof; and pumping means formed on the inboard end of said member for creating a suction in said groove to scavenge fluid from the surface of said bushing abutting said groove and returning it to the interior of the housing.

4. A fluid seal for a shaft rotatably mounted in a bore in a housing, comprising: a bushing fixedly mounted in the bore; sealing means disposed within said bushing, the sealing means including a member mounted on the shaft and provided with a labyrinth type seal having projecting land means in close fit with said bushing, said member having a sleeve portion in close fit with said bushing, the sleeve portion having a circumferential groove in the surface contiguous said bushing at a region intermediate the land means and the inboard end of said bushing; and pumping means formed on the inboard end of said member for creating a suction in said groove to scavenge fluid from the surface of said bushing abutting said groove and returning it to the interior of the housing.

5. A fluid seal for a rotary shaft disposed through an opening in a wall of a housing, comprising: sealing means disposed within the opening, the sealing means including a member mounted on the shaft and provided with a labyrinth type seal having projecting land means in close fit with the wall of the opening, said member having a sleeve portion in close fit with the wall of the opening, the sleeve portion having a circumferential groove in the surface contiguous the wall of the opening and adjacent the inboard end thereof; and pumping means formed on the inboard end of said member for creating a suction in said groove to scavenge fluid from the surface of the wall of the opening abutting said groove and returning it to the interior of the housing.

References Cited in the file of this patent

UNITED STATES PATENTS

| | | |
|---|---|---|
| 1,313,736 | Rice | Aug. 19, 1919 |
| 1,908,956 | Chievitz | May 16, 1933 |
| 2,245,281 | Klopak | June 10, 1941 |
| 2,274,836 | Koster | Mar. 3, 1942 |
| 2,383,531 | Caruthers | Aug. 28, 1945 |
| 2,524,124 | Gyana | Oct. 3, 1950 |